March 29, 1966  J. N. DUPREE  3,242,962
INSERT
Filed June 26, 1962
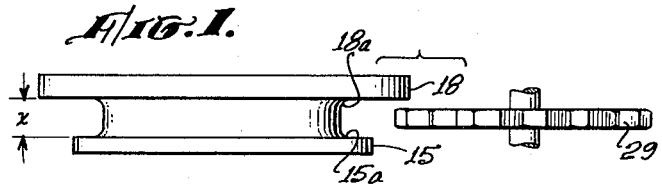
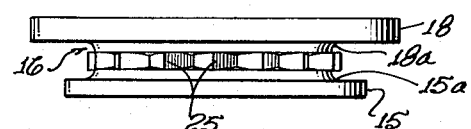
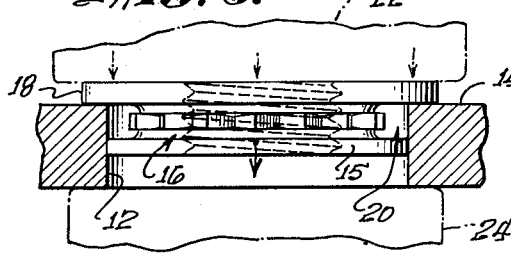 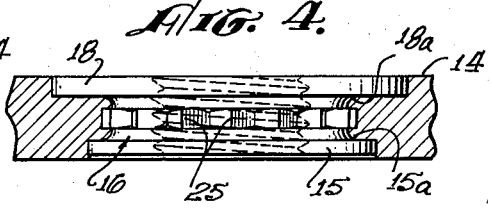
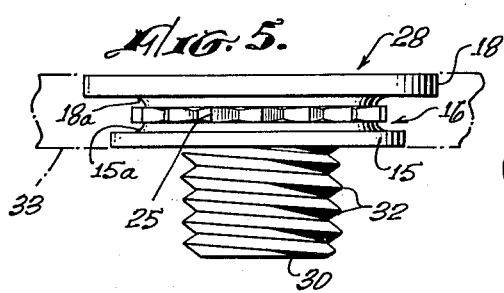 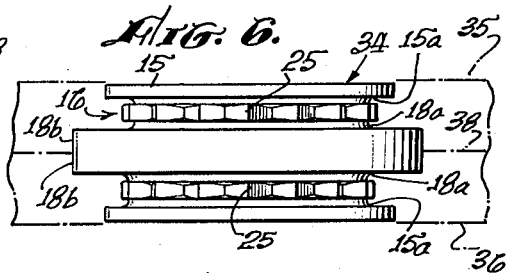
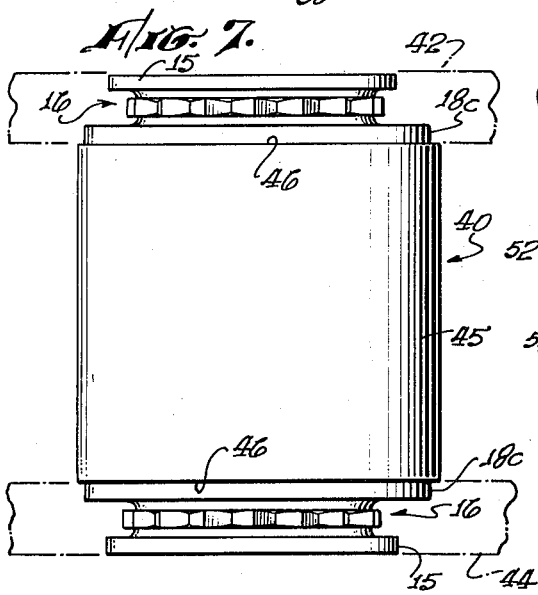 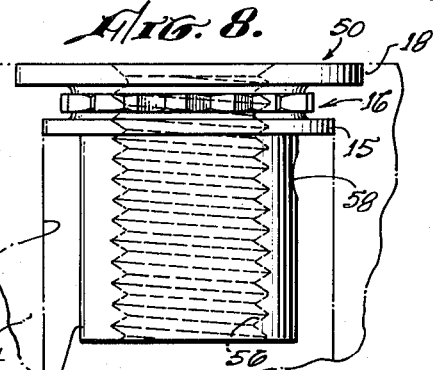
JAMES N. DUPREE,
INVENTOR.
BY
Smyth, Roston & Pavitt
ATTORNEYS.

United States Patent Office 3,242,962
Patented Mar. 29, 1966

3,242,962
INSERT
James N. Dupree, 1435 E. Rowland Ave.,
West Covina, Calif.
Filed June 26, 1962, Ser. No. 205,413
4 Claims. (Cl. 151—41.73)

This application is a continuation-in-part of my co-pending application of the same title, Serial No. 841,622 filed September 22, 1959, now abandoned.

This application relates to inserts of relatively hard material for mounting in bodies and sheets of relatively soft material capable of displacement flow.

The relatively soft material may be metal. For example, the metal may be aluminum, copper or alloys of the same or mild steel, all of which are capable of displacement flow under pressure and especially sustained pressure sufficient to heat the material by internal friction. The relatively soft material in which the insert is to be mounted may also be a plastic capable of displacement flow under pressure or capable of displacement flow under pressure with applied heat.

The underlying concept is to provide an insert of such shape that abruptly forcing the insert into a bore or aperture causes the material rimming the bore or aperture to be displaced both axially and radially inward into positive gripping engagement with the insert. For this purpose, the insert is formed with three successive integral portions, namely, a first circular pilot portion of approximately the diameter of the aperture or bore for sliding guidance by the aperture or bore, an adjacent intermediate neck portion of less diameter to provide an annular space to receive the displaced material, and a third oversized portion adjacent the neck portion of greater diameter than the bore.

The insert is initially positioned with its pilot portion and its adjacent neck portion inside the bore or aperture and with its third oversized portion abutting the rim of the bore or aperture. The insert is then placed under high magnitude pressure to force the third oversized portion abruptly and completely into the material of the body or sheet for the required displacement of material into gripping engagement with the neck portion of the insert. In this regard, a feature of the invention is the concept of the third oversized portion being in the form of a radial flange of just the thickness to displace the required amount of material when the flange is driven flush with the surface of the sheet or body. The flange may be either an end flange or an intermediate flange.

It has been found that, given the basic concept of an insert as described to this point, three difficulties must be taken into consideration. In the first place, the insert may be rotatable in the material in which it is installed and while such rotation may be permissible in some instances, it is usually required that at least a part of the insert that is surrounded by the material in which it is inserted be of non-circular cross sectional configuration.

In the second place, a non-circular configuration that is of polygonal cross section or is peripherally toothed or serrated presents points to the surrounding material that may cause local stress concentrations in the surrounding material as the surrounding material is displaced inwardly against the points. In many installations the insert is subjected to vibration and shock forces that cause fracture lines to radiate out from the stress points with consequent failure of the material in which the insert is embedded.

In the third place, the insert itself may fail where it is reduced in cross sectional dimension to form the neck portion. It has been found that if the leading pilot portion and the oversized portion are formed by radial cuts into the metal, the insert tends to fracture at the inside corners when it is subjected to heavy loading or repeated shocks or sustained vibration. It has been further found that deforming the neck of the insert at these inside corners, for example by serrating the neck, increases the vulnerability of the insert to fracture.

The present invention solves all of these difficulties by new configuration relationships. The insert itself is given maximum strength by avoiding radial shoulders that 90° inside corners. Instead both the shoulder formed by the leading pilot portion and the shoulder formed by the oversized portion of the insert are formed with fillets that eliminate any tendency for the insert to fracture in these regions. The neck portion is serrated to solve the problem of keeping the insert from rotating in the material in which it is embedded but the serrations do not extend to the fillets.

The neck serrations necessarily provide points against which the surrounding material is displaced in the course of the installation procedure with consequent creation of stressed points where the inwardly displaced material meets the outer edges of the serration teeth. Potential failure of the displaced material is avoided, however, by keeping the neck serrations well within the outside diameter of the fillet-formed shoulders so that the stress points in the surrounding material are amply overshadowed by the shoulders.

The features and advantages of the invention may be understood from the following detailed description, together with the accompanying drawing.

In the drawing, which is to be regarded as merely illustratitve:

FIG. 1 is a side elevational view illustrating the preferred procedure for fabricating an insert for use in a thin sheet of relatively soft material;

FIG. 2 is a side elevation of the finished insert;

FIG. 3 shows the insert in side elevation positioned in an aperture of a sheet that is shown in section, the insert being poised for the application of pressure to cause the desired displacement of material;

FIG. 4 is a similar view with the insert completely installed;

FIG. 5 is a side elevational view of an insert with an axial extension in the form of a threaded stud;

FIG. 6 is a side elevation of a dual insert to serve as means for riveting together two sheets of material;

FIG. 7 is a side elevation of a dual insert to be employed for interconnecting two sheets or bodies with predetermined spacing between the sheets or bodies; and FIG. 8 is a side elevational view of an insert having an internally threaded tubular extension.

FIG. 1 shows how an insert blank, generally designated 10, may be processed to form the finished insert shown in FIG. 2 which is designed and dimensioned for mounting in a bore or aperture 12 of a sheet 14. As heretofore stated, the sheet may be of relatively soft metal or at least a metal capable of displacement flow under pressure with displacement flow facilitated by heat generated by internal friction. The sheet 14 may also be made of a suitable plastic material, for example, a thermoplastic material to which heat may be applied to facilitate the required displacement flow. In this instance, it is assumed that the sheet 14 is made of metal such as mild steel, aluminum, magnesium, copper or the like.

The insert 10 is made of hard metal or at least is substantially harder than the metal of the sheet 14. The insert 10 has three successive axial portions, namely, a first circular leading pilot portion 15 that is only slightly under the diameter of the bore 12 for sliding fit in the bore, a second intermediate neck portion 16 of substantially less diameter than the bore 12 and a third oversized portion 18 that is substantially larger in diameter than the bore 12. In this particular embodiment of the insert, these three successive portions make up the full axial dimension of the insert and this axial dimension is approximately the thickness of the sheet 14. As shown in an exaggerated manner in the drawing, the axial dimension of the insert may be slightly less than the thickness of the sheet 14 so that the installed insert lies wholly within the planes of the sheet 14, i.e. in the space defined by the two opposite faces of the sheet.

In accord with the teaching of the invention, the volume of the oversized portion 18 that lies outside the diameter of the bore 12 is just large enough to cause just enough material of the sheet 14 to be displaced within the planes of the sheet to fill the annular space around the neck portion 16 of the insert that lies within the radial bore, i.e. within the diameter of the pilot portion 15 of the insert. In practice it is found that some of the displacement of the sheet material is towards the adjacent surface of the sheet 14 to cause slight thickening or bulging of the sheet and, therefore, the amount of the sheet material to be displaced by the oversized portion 18 of the insert should be slightly increased over the volume of the annular neck space to cause the neck space to be completely filled with the displaced sheet material. The thickening effect varies slightly with different sheet materials and the exact required increase in displacement over the volume of the annular neck space may vary between 8% and 12%. The average of this range is taken, the volume of the oversized portion 18 that lies outside the diameter of the pilot portion 15 being approximately 10% greater than the volume of the annular neck space that lies within the diameter of the pilot portion 15.

The insert 10 is initially partially inserted into the bore 12 in the manner shown in FIG. 3 with the oversized portion 18 abutting the face of the sheet 14 against the rim of the bore. The insert is then forced to the position shown in FIG. 4 in one continuous abrupt movement to cause the material of the sheet 14 to be displaced radially and axially inward by the oversized portion 18 of the insert, the displaced material moving into the annular space 20 to substantially fill the annular space and grip the neck portion 16 of the insert.

The insert may be mounted in this manner by suitable anvil means comprising two opposed anvil members 22 and 24. These two anvil members 22 and 24 close against the sheet 14 in a single rapid movement for maximum heating of the displaced material by internal friction and for minimum loss of the generated heat. Such an anvil operation is in contrast with the common procedure for installing an insert by repeated impacts with opportunity for the metal to cool between impacts. Such successive impacts work-harden and crystallize the metal surrounding the insert.

It is to be noted in FIG. 3 that the anvil member 24 is substantially larger in diameter than the bore 12 and abuts a liberal margin of the undersurface of the sheet 14 around the bore to keep the metal of the undersurface of the sheet from bluging when the insert is forced into the material of the sheet. It is also to be noted in FIG. 3 that the upper anvil member 22 is substantially larger in diameter than the oversized portion 18 of the insert, the upper anvil member having a leading face in the same plane as the rear edge of the portion 18 of the insert. It is apparent that when the upper anvil member 22 forces the oversized portion 18 of the insert into a final position at which the oversized portion is completely embedded in the sheet 14 as shown in FIG. 4, the leading face of the upper anvil member 22 abuts the sheet to eliminate any tendency of the sheet to bulge at its upper surface adjacent the enlarged portion 18 of the insert. Thus the movement of the leading face of the tool against the sheet 14 cooperates with the enlarged portion 18 of the insert to direct the metal displaced by the enlarged portion 18 into the annular space 20 of FIG. 3 to grip the neck portion 16 of the insert, there being minimum bulging of the sheet around further advantageous because the upper surface of the the embedded enlarged portion 18. This procedure is sheet 14 serves as a stop for the upper anvil member 22. The applied force may be regulated to be ample for causing the enlarged portion 18 to be completely embedded in the sheet 14 but to be less than necessary for the anvil member 22 to penetrate the material of the sheet. With the magnitude of the force selected in this manner, the upper anvil member 22 is automatically stopped by contact with the sheet 14 to terminate the advance of the insert into the material of the sheet.

When the insert 10 is installed in the sheet 14 in this manner, the insert becomes in effect a unitary portion of the sheet and makes effective sealing contact with the material of the sheet all the way around the periphery of the insert. In this particular embodiment, the insert has a threaded axial bore 26 for engagement with some complementary screw fastening device. The axial bore 26 need not be threaded and the axial bore may be omitted entirely if a blank insert is desired. A blank insert may be desired to provide a local hard surface for the sheet.

Referring back to FIG. 1, it is to be noted hat the leading pilot portion 15 of the insert blank is formed with a fillet 15a and the oversized portion 18 is formed with a similar fillet 18a. It is to be further noted that the thickness of a knurling tool 29 for forming the peripheral teeth 25 in the neck portion is less than the axial distance between the two fillets 15a and 18a. Consequently the operation of forming the teeth by the knurling tool does not deform the two fillets, the resultant teeth 25 being of substantially less dimension axially of the insert than the distance x between the pilot portion 15 and the oversized porion 18. The axial dimension of the knurled portion varies from approximately 60% of the dimension x for a relatively short insert of .040 inch length for use in a thin sheet to approximately 70% for a longer insert of .180 inch length for use in thicker sheets.

It can be seen in FIG. 2 that the outer diameter of the serrated portion of the neck is substantially less than the diameter of the pilot portion 15 of the insert and is even smaller in comparison with the diameter of the oversized portion 18. Thus in FIG. 4, the stress points and the displaced sheet material at the outer edges of the serration teeth 25 are amply flanked or overhung and thereby contained by the pilot portion 15 and the oversized portion 18 of the insert. Stressing of the installed insert by a sustained force or by a shock force or by continual vibration does not cause fractures to radiate from the stress points at the outer edges of the teeth 25 not only because the stress points are sheltered but also because the stresses are conveyed from the insert to the sheet material primarily from the fillet-formed pilot portion 15 and the fillet-formed oversized portion 18 where the sheet material is free from stress points.

The insert 28 shown in FIG. 5 is similar to the insert 10, being formed with the same three axial portions 15, 16 and 18. The neck portion 16 is knurled. This insert is an example of an insert of the described character that is formed with an integral axial extension. In this instance, the integral axial extension 30 is of the character of a stud. The stud may have a plain cylindrical surface or may be formed with an external screw thread 32 for cooperation with complementary threaded fastening members. When the insert 28 is installed in a sheet 33 by the procedure shown in FIGS. 3 and 4, the stud 30 extends outward from one surface of the sheet.

It is apparent that the engagement of such an insert with a surrounding sheet offers greater shear resistance in one axial direction than in the other axial direction. Thus greater force would be necessary to pull the insert in FIG. 4 out of the sheet 33 in the axial direction of the circular portion 15 than would be required to pull the insert out of the sheet in the opposite axial direction of the oversized portion 18. The stud 30 in FIG. 5 is on the side of the insert for maximum shear resistance to withdrawal of the insert by tensioning of the stud 30. If the stud 30 were intended to be loaded in compression, the three successive axial portions 15, 16 and 17 would be reversed in position to provide maximum resistance in shear to removal of the insert by the compression load. In other words, the oversized portion 18 instead of the portion 15 would be adjacent the stud 30.

The insert that is generally designated 34 in FIG. 6 is what may be termed a dual insert to serve as means for uniting two sheets 35 and 36 in face to face relation. The insert 34 may be considered as divided by a middle transverse plane 38 into two opposite ends for engagement with the two sheets 35 and 36. Each of these ends is formed with the usual three successive axial portions, namely, a first axially outer portion 15, a second intermediate knurled neck portion 16 and an oversized portion 18b, the two oversized portions 18b being the two axial halves of a central oversized flange. This insert 34 is forced into the two sheets 35 and 36 in the manner heretofore described. The insert may be forced into the two sheets 35 and 36 simultaneously by a single closing operation of the previously mentioned anvil members 22 and 24. The overall axial dimension of the insert 34 should usually be no greater than the combined thickness of the two sheets 35 and 36 and may be slightly less than the combined thickness. It is apparent that the insert 34, in effect, rivets the two sheets 35 and 36 but the rivet metal, i.e. the metal that is displaced for interconnecting the sheets is the metal of the sheets themselves instead of the metal of the fastening device. One advantage, of course, is that the fastening member may be made of exceedingly hard material of higher shear strength than a conventional rivet.

In FIG. 6, the two sheets 35 and 36 are of the same thickness and are provided with bores of the same diameter. It is to be understood however, that the insert may be shaped and dimensioned to cooperate in the same manner with sheets of different thickness and with bores that differ in size.

The insert that is generally designated 40 in FIG. 7 is also a dual insert having two opposite ends to engage two sheets 42 and 44 for interconnecting the two sheets. In this instance, the dual insert serves not only to interconnect the two sheets 42 and 44 but also to space the two sheets apart by a predetermined distance.

Each of the two ends of the dual insert 40 has the usual three successive axial portions, namely, an axially outer first portion 15, an adjacent intermediate neck portion 16 and a third oversized portion 18c. The neck portion 16 may be knurled as shown or may be plain.

The central body portion 45 of the insert 40 that spaces the two sheets 42 and 44 apart may be of any diameter. In this instance, the central body portion 45 is larger in diameter than the adjacent oversized portions 18c and thus forms an outer circumferential shoulder 46 adjacent each of the oversized portions 18c. These circumferential shoulders 46 abut the inner faces of the two sheets 42 and 44 to hold the two sheets apart in a positive manner. A feature of the insert in this regard is that the two circumferential shoulders 46 also serve as stop shoulders in the operation of forcing the two ends of the insert into engagement with the two respective sheets 42 and 44.

In this particular embodiment of the dual insert, the total axial dimension at each end of the insert at the three successive portions 15, 16 and 18c is approximately the thickness of the corresponding sheet. It is apparent that such a dual insert may be designed for engagement with two sheets of different thicknesses and may be designed to cooperate with bores of different diameters in the two sheets.

The insert 50 shown in FIG. 8 is of the same general character as the other inserts, being formed with the usual three successive axial portions, namely, a first portion 15, a second intermediate neck portion 16 which may be knurled as shown and an oversized portion 18. The insert 50 is intended to be mounted in a relatively deep bore 52 in a body 54 and is provided with an integral tubular axial extension 55 that is intended to extend into the bore. The insert 50 is provided with a threaded axial bore 56 that extends into the tubular extension 55 and in this instance extends all the way through the extension. The axial bore 56 is intended for threaded engagement with a complementary screw fastener and the internal screw thread of the insert may be deformed by self-locking engagement with the screw fastener. For this purpose, the tubular extension 55 is peripherally indented as indicated at 58 to distort the internal screw thread. The insert 50 is forced into the body 54 in the manner heretofore described.

In the forms of the insert shown in FIGS. 2, 5 and 8, the oversized axial portion 18 is an end portion and may be aptly termed a disk portion. In these forms of the invention, the driving of the disk portion 18 into flush relationship with the surrounding material accomplishes the displacement of the required amount of material for effectively gripping the adjacent neck portion of the insert. An axial portion 18 may also be aptly termed an end flange which is to be sunk flush with the surrounding material. In FIG. 6, the two oversized portions 18b constitute intermediate flanges, i.e. flanges intermediate the two ends of the insert.

My description in specific detail of the selected embodiments of the invention will suggest various changes, substitutions and other departures from my disclosure within the spirit and scope of the appended claims.

I claim:

1. An insert of relatively hard material for mounting in a bore in a body of relatively soft material, said insert having three successive axial portions, namely, a first pilot portion of a first diameter substantially equal to the diameter of said bore, a reduced neck portion adjacent said pilot portion and a third oversized portion adjacent said neck portion, said insert having a circumferential series of outwardly extending teeth integral with said neck portion to prevent rotation of the insert in said body, said teeth being of less axial dimension than said neck portion and being spaced axially of the insert both from said pilot portion and from said oversized portion, said neck portion being substantially smaller in cross section than said pilot portion and said oversized portion being of a diameter substantially larger than said first diameter whereby the insert may be partially inserted in the bore with said pilot portion and said neck portion in the bore and then said oversized portion may be forced into the bore for flow displacement of the adjacent material of the body radially inward to grip said neck portion, the diameter defined by the outer edges of said teeth being substantially smaller than said first diameter whereby stress points in the displaced material of the body created by the outer edges of said teeth radially outward from the edges of the teeth are confined between said pilot portion and said oversized portion of the insert inside the circumferences of both of the pilot portion and the oversized portion, the volume of said oversized portion that lies outside said first diameter being on the order of 110% of the volume of the annular space formed by said neck portion that lies inside said first diameter to cause the displaced material to substantially fill said annular space and to compensate for approximately 10% of the displacement being radially outward away from the insert.

2. An insert of relatively hard material for mounting in a bore in a body of relatively soft material, said insert having three successive axial portions, namely, a first pilot portion of a first diameter substantially equal to the diameter of said bore, a reduced neck portion adjacent said pilot portion and a third oversized portion adjacent said neck portion, said insert having a circumferential series of outwardly extending teeth integral with said neck portion to prevent rotation of the insert in said body, said teeth being of less axial dimension than said neck portion and being spaced axially of the insert both from said pilot portion and from said oversized portion, said neck portion being formed with a fillet in the longitudinal space between the pilot portion and the teeth, said neck portion being formed with a second fillet in the longitudinal space between the oversized portion and the teeth, said neck portion being substantially smaller in cross section than said pilot portion and said oversized portion being of a diameter substantially larger than said first diameter whereby the insert may be partially inserted in the bore with said pilot portion and said neck portion in the bore and said oversized portion overlapping the rim of the bore and then said oversized portion may be forced into the bore for flow displacement of the adjacent material of the body radially inward to grip said neck portion, the diameter defined by the outer edges of said teeth being substantially smaller than said first diameter whereby stress points in the displaced material of the body created by the outer edges of said teeth radially outward from the edges of the teeth are confined between said pilot portion and said oversized portion of the insert inside the circumferences of both the pilot portion and the oversized portion, the volume of said oversized portion that lies outside said first diameter being on the order of 110% of the volume of the annular space formed by said neck portion that lies inside said first diameter to cause the displaced material to substantially fill said annular space and to compensate for approximately 10% of the displacement being radially outward away from the insert.

3. A fastening member of relatively hard material for insertion into aligned bores of two bodies of relatively soft material to interconnect the two bodies, each of the two opposite ends of said member having an axially outer pilot portion of a first diameter substantially equal to the diameter of the corresponding bore to fit into the bore, an adjacent reduced neck portion substantially smaller in cross section than said first portion and a third axially inward oversized portion adjacent said neck portion of substantially larger diameter than said first pilot portion, said neck portion having a circumferential series of outwardly extending teeth integral therewith, said teeth being of less axial dimension than said neck portion and being spaced axially of the member both from said pilot portion and from said oversized portion whereby the opposite ends of said member may be partially inserted in the corresponding bores with the oversized portions of the member overlapping the rims of the two bores and then each of said oversized portions may be forced into the corresponding bore for flow displacement of the material around the bore radially inward to grip the corresponding neck portion, the diameter defined by the outer edges of said teeth at each end of the member being substantially smaller than the diameter of the adjacent pilot portion whereby stress points in the displaced material created by the outer edges of the teeth radially outward from the edges of the teeth are confined between the adjacent pilot portion and the adjacent oversized portion of the member inside the circumferences of both the pilot portion and the oversized portion.

4. A circular fastening member of relatively hard material for mounting in aligned bores in two sheets of relatively soft material to anchor the two sheets together in face to face relation, said member having an axial dimension approximating the combined thickness of the two sheets, each of the two opposite ends of said member having three successive axial portions, namely, a first outer end pilot portion of a first diameter substantially equal to the diameter of the bore in the corresponding sheet, an adjacent reduced neck portion of substantially smaller cross section than said pilot portion and a third oversized portion adjacent the neck portion, said neck portion having a circumferential series of teeth integral therewith, said teeth being of less axial dimension than said neck portion and being spaced axially of the member both from the adjacent pilot portion and from the adjacent oversized portion, each of said oversized portions being substantially larger in diameter than the corresponding pilot portion whereby said member may be partially inserted at its opposite ends into said bores respectively with the oversized portions of the member overlapping the rims of the bores and then the oversized portions may be forced into the two respective bores for flow displacement of the material of the two sheets radially inward to grip the corresponding neck portions of the member, the diameter defined by the outer edges of the teeth of each of said two neck portions being substantially smaller than the diameter of the adjacent pilot portion whereby stress points in the displaced material created by the outer edges of said teeth radially outward from the edges of the teeth are confined between the adjacent pilot portion and the adjacent oversized portion of the member inside the circumferences of both the pilot portion and the oversized portion.

References Cited by the Examiner

UNITED STATES PATENTS

| 1,842,117 | 1/1932 | Renshaw | 151—41.73 |
| 2,164,017 | 6/1939 | Lavarack et al. | 85—32 |
| 2,686,546 | 8/1954 | MacLean | 151—21 |
| 2,782,827 | 2/1957 | Rosan | 151—41.73 |
| 3,000,420 | 9/1961 | Spokes | 151—41.73 |

FOREIGN PATENTS

| 222,528 | 7/1939 | Australia. |
| 812,540 | 4/1959 | Great Britain. |

CARL W. TOMLIN, *Primary Examiner.*